United States Patent [19]
Toner

[11] Patent Number: 5,156,271
[45] Date of Patent: Oct. 20, 1992

[54] TAPES TO CONVERT DUST COVER JACKETS TO THE AESTHETIC APPEARANCE OF BOOKS

[76] Inventor: Robert C. Toner, 29 Parkview Dr., Clinton, Pa. 15026

[21] Appl. No.: 785,446

[22] Filed: Oct. 31, 1991

Related U.S. Application Data

[63] Continuation of Ser. No. 429,173, Oct. 10, 1989, abandoned.

[51] Int. Cl.⁵ ............... B65D 73/00; B42D 15/00; B32B 32/00
[52] U.S. Cl. ................... 206/457; 156/227; 156/277; 283/81; 446/901; 206/472
[58] Field of Search .............. 156/277, 60, 226, 227, 156/240, 247, 240; 206/457, 459–460, 472; 283/81; 40/312, 389; 446/479, 482, 901

[56] References Cited

U.S. PATENT DOCUMENTS

| | | | |
|---|---|---|---|
| 190,980 | 5/1877 | Plimpton | 206/457 X |
| 644,623 | 3/1900 | Mueller | 206/457 X |
| 2,081,202 | 5/1937 | Hoyt | 281/36 |
| 2,341,600 | 2/1944 | Daniel | 206/457 |
| 2,387,790 | 10/1945 | Williamson | 206/457 X |
| 4,467,920 | 8/1984 | Smith | 206/457 |
| 4,503,974 | 3/1985 | Lane | 206/457 |
| 4,789,058 | 12/1988 | Blaney | 206/459 X |

*Primary Examiner*—David A. Simmons
*Assistant Examiner*—Chester T. Barry
*Attorney, Agent, or Firm*—Harry D. Anspon

[57] ABSTRACT

The dust cover jackets in which video cassette tapes, audio cassette tapes or compact disks are sold are converted to aesthetically pleasing appearance by means of a tape printed to simulate the spine of a leather bound book with a part of the length of the tape also simulating the page end of the leather bound closed book. The tape is applied to the top and back edges of the dust cover jackets by means of a pressure sensitive adhesive on the back of the printed surface of the tape. The tapes are provided with release paper to avoid premature adhesion to other surfaces prior to their mounting on the dust cover jackets.

5 Claims, 1 Drawing Sheet

TAPES TO CONVERT DUST COVER JACKETS TO THE AESTHETIC APPEARANCE OF BOOKS

This is a continuation of application Ser. No. 07/429,173 filed Oct. 10, 1989 now abandoned.

BACKGROUND OF THE INVENTION

1. Field of the Invention

This invention concerns a means by which the dust cover jackets of video tape cassettes, audio tape cassettes and compact disks can be converted to the pleasing and aesthetic appearance of books with quality bindings. A tape is printed with a design to simulate in one portion the appearance of the spine of a book with a quality binding and, in an adjacent portion, with a design to simulate the appearance of the top page edge of the closed said book with a quality binding. By adhering the said tape to the back edge or face and top edge or face of a dust cover jacket, the said jacket is provided the appearance of a closed book with a quality binding.

Any user of video or audio cassette tapes or compact disks amasses a collection of such cassettes or disks to be employed on his video and/or audio equipment in producing pictures and/or sound from the signals stored on the tapes or disks. These cassettes or disks are sold in protective packages which usually provide a cardboard jacket generally parallel piped in shape which is open at one end to permit the insertion of the cassette or disk within the cardboard dust cover. The dust cover jackets are employed for storage of the cassettes or disks when they are not in use. The cardboard dust cover jackets often carry pictures or printing to advertise or illustrate their contents. As a result the cardboard dust cover jackets differ in appearance from one jacket to another, depending on the cassette tape which was in the jacket when it was purchased.

To provide the maximum dust protection, the dust cover jackets are usually faced outward on a storage shelf with their end wall facing the user. The appearance of a number of such jackets on a storage shelf is seldom pleasing, since there is no coordination of appearance. To avoid such a jumbled appearance, closed storage units often are used to store the dust cover jackets and their cassettes or disks, despite the desirability of having the dust cover jackets with their cassettes or disks readily at hand for selection of a particular cassette or disk.

2. Description of the Prior Art

U.S. Pat. No. 4,789,058, issued on Dec. 6, 1988, to Blaney, provides a display means for video cassettes using a jacket with no printing matter on the end wall facing the user. This jacket casing member may be made of a solid colored leatherette material. In the library apparatus of U.S. Pat. No. 4,789,058 the display jacket is preferably made of a solid colored material. This jacket is separate from the dust cover jacket provided with a cassette tape.

In the invention of this disclosure, no new dust cover jacket is required as the decorative tape converts the original dust cover jacket to the appearance of a book in the visible portions of the dust cover jacket. It also should be noted that the tape of this application simulates the top page edge appearance of a book, while the casing display jacket of U.S. Pat. No. 4,789,058 has only a solid colored material over its top edge and does not truly resemble a book in appearance.

Thus, in the past, one either hid his cassettes with their dust cover jackets in a drawer or cabinet with an attractive wood exterior, or one purchased dust cover jackets with a uniform appearance such as is described in U.S. Pat. No. 4,789,058. Since the casing of Blaney's invention was substantially free of printing material on the end wall of the casing, a number of such casings did present a uniform aesthetic appearance on a shelf.

SUMMARY OF THE INVENTION

The present invention provides a printed tape with a one portion of the tape simulating the spine of a quality bound book and an adjacent portion of the tape simulating the top end pages of the same book in a closed state.

By adhering this tape to the back edge of a dust cover jacket and to the top edge of the same dust cover jacket, the commercial dust cover jacket is transformed in appearance on its back and top edges to that of a quality bound book. The printed tape portion with the appearance of the spine of a quality bound book causes the back edge of the dust cover jacket to look like a book, while the printed tape portion with the appearance of the page end of a closed book causes the top edge of the dust jacket to look like a closed book's page end. When the dust cover jackets with their cassettes are stored on a shelf between book ends, these back edges and top edges are the only parts of the dust cover jackets containing the cassettes which are visible. This visible part of a row of dust cover jackets with cassettes takes on the look of a set of books with quality bindings.

In the invention of this application, no new dust cover jacket is required as the tape with its decorative printing is adhered to the back and top edges of the original dust cover jacket for the cassette or disk. The tape of this application simulates the top page edge appearance of a closed book, while the casing display jackets of U.S. Pat. No. 4,789,058 have only a solid colored material on their top edges, and, although a set of such jackets may convey an aesthetic library-like appearance they do not resemble a set of library books with fine bindings.

BRIEF DESCRIPTION OF THE DRAWINGS (PHOTOGRAPHS)

DESCRIPTION OF THE ILLUSTRATED EMBODIMENTS

Figure 1:
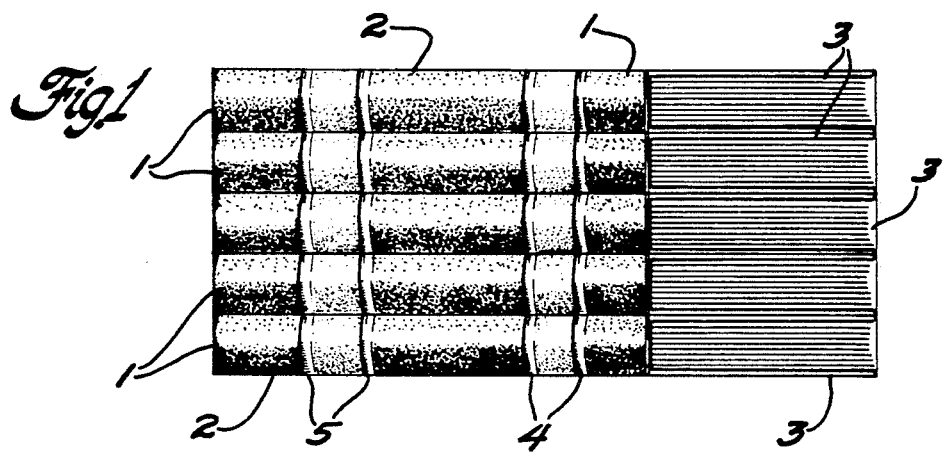
FIG. 1 shows a top view of 5 tapes of this disclosure with their printed simulation of a book spine and the top page edge of a book. The tapes are coated on their backs with a pressure sensitive adhesive and are mounted on a sheet of release paper which is adjacent to their pressure sensitive adhesive coatings.

In FIG. 1 the tape 1 simulates the spine of a book in the lower portion 2 of tape 1. The page edge of a closed book is simulated in the upper portion 3 of tape 1. Two pairs of simulated curved gold bands are shown at top and bottom parts 4 and 5 on the lower portion 2 of tape 1. In FIG. 1, the tapes simulate the appearance of leather bound books by graining and highlights in the printing. The slight curvatures in the simulated gold bands at parts 4 and 5 duplicate the appearance of gold tooling on the spine of a leather book with its rounded end binding.

Figure 2:
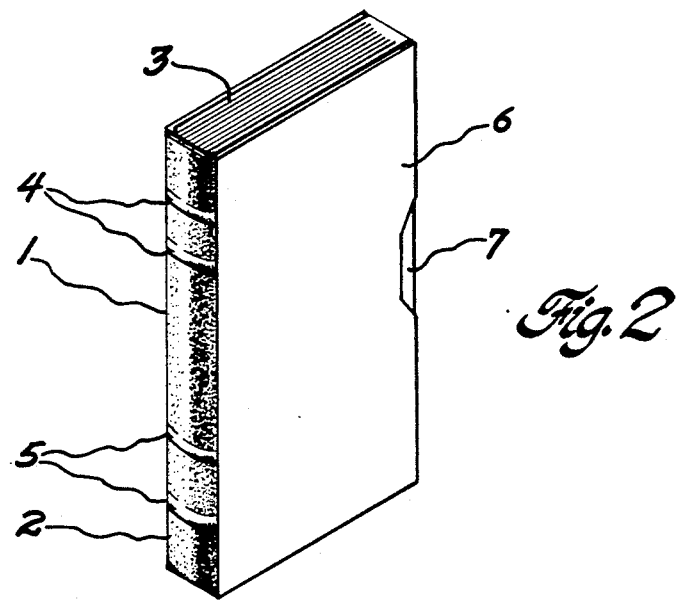
FIG. 2 shows a perspective view of a tape with its printed simulation of a book spine and the top page edge of a book mounted on a dust cover jacket of a video cassette.

In FIG. 2 the tape 1 is affixed to the back edge and top edge of a dust cover jacket 6 by the pressure sensitive adhesive coating on the back of the decoratively printed tape 1. The back edge of the dust cover jacket 6 is covered by the portion 2 of tape 1 simulating the spine of a leather bound book. The top edge of the dust cover jacket 6 is covered by the portion 3 of the tape 1 simulating the top page edge of a leather bound book. The cassette 7 stored in the dust cover jacket 6 whose back and top edges are covered with tape 1 is not visible.

Figure 3:
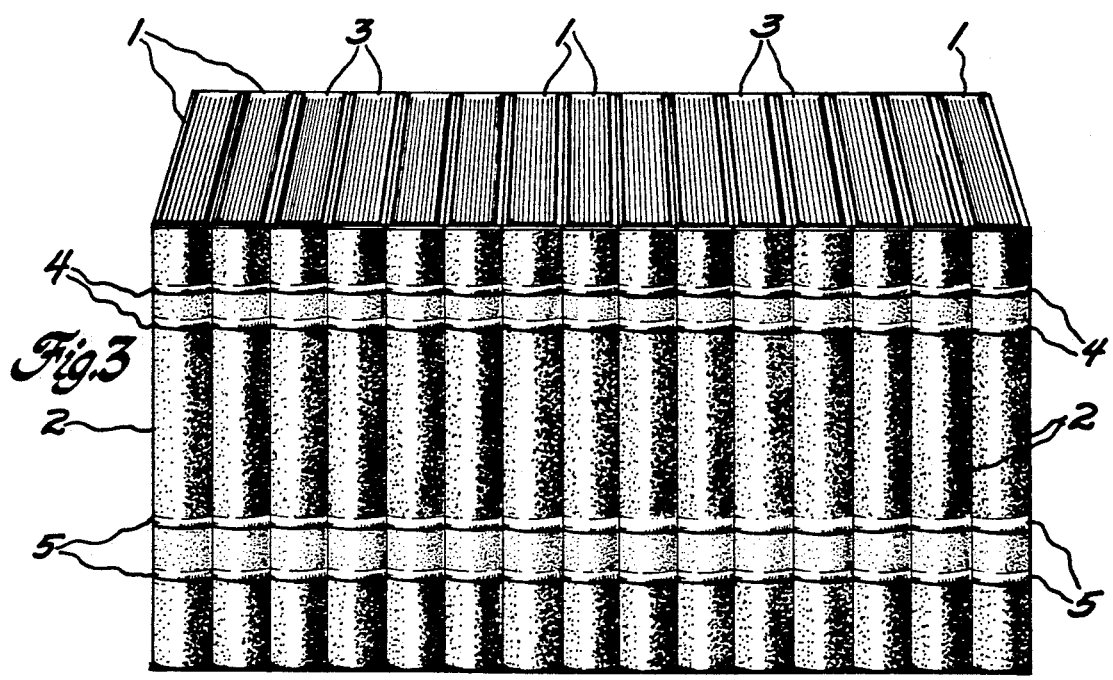
FIG. 3 shows a perspective view of a shelf of video cassettes stored in dust jackets covered with the decorative tape of this disclosure.

In FIG. 3 a set of dust cover jackets 6 with cassettes 7 (not depicted) is shown wherein each dust cover jacket 6 is covered by a tape similar to tape 1. A pleasing and realistic impression of a set of fine leather books is obtained.

While it is not illustrated in any of the figures, the area within the lower pair of gold bands 5 of FIG. 1 may be lettered with a code: numeric, alphabetic, combined numeric-alphabetic, or with a Dewey Decimal system to identify the cassette 7 contained in the dust jacket 6. Any lettering means may be used from hand lettering to attaching characters printed on a pressure sensitive strip.

The code is recorded in a notebook or on file cards, either of which may be stored in an empty dust cover jacket which has been covered on its back and top edges with the decorative tape of this disclosure.

One of the desirable features of using a decoratively printed tape to convert a dust cover jacket to the appearance of a book is that such tapes may be printed in different simulated book bindings to provide a library-like appearance of several different sets of books on storage shelves. Even only color changes of the decorative printing with the same patterns can achieve this effect. The tapes with different simulated book bindings also can be employed to provide a classification coding to different groups of cassettes in their dust cover jackets.

Another advantage of printing the tapes is that the decorative printing with graining and highlights and curvatures in simulated gold tooling bands is more realistic in the impression of a library book than is a solid colored flat jacket end.

The material of the tape may be embossed as well as printed to accentuate graining. While the preferred material employed for the tape is paper because of its versatility in the printing process, other materials such as plastics and metal foils may be used in the tapes. Laminations involving any combination of paper, plastics or metal foils may be employed. Any suitable method of lamination may be used to form such tapes. The tapes may be coated with a plastic by solvent coating, by film extrusion or by film lamination with adhesive. The chief requirement is that the material for the tapes posses a printable surface at one stage in the formation of the final tape. The printing may be subsequently protected by plastic overcoating.

The thickness of the tape may be around 15 mils (381 microns) when it is desirable for embossing or printing effects. However, the tape normally is around 5 mils (127 microns) thick for greatest flexibility in conforming to the surface of the dust cover jackets. Tapes as thin as 0.5 mil (12.7 microns) are possible in composite films. These dimensions are exclusive of the adhesive layer.

The tapes with their decorative printing simulating the spine and top page edge of a book may be adhered to the dust cover jackets by application of glues or adhesives to the back of the tape and/or the back and top edges of the dust cover jackets. The preferred means of adhesion of the tapes to dust cover jackets is by a pressure sensitive adhesive coated on the back of the decoratively printed tapes. In the most preferred embodiment the pressure sensitive adhesive on the back of the decorative tapes is placed against a release paper for storage until the tape is removed from the release paper for pressing against dust cover jacket back and top edges to cause its adhesion to said edges.

Since the dimension of the tape is selected to cover the long back edge of a dust cover jacket and its top edge, it is desirable that the material or combination of materials employed for the tape be of sufficient stiffness so that it does not elongate in application of the tape to the dust cover jacket. Since the tape is relatively thin, a flexible plastic desirably is not used by itself. It normally would be laminated with paper, foil or fibers (woven or non-woven) into a composite film to reduce its tendency to elongate.

The tape is coated on its back side with a pressure sensitive adhesive to allow it to be adhered to the dust cover jackets. In order to handle or process the tape when it bears its pressure sensitive adhesive coating on its back side, the tape is mounted on a release paper or film. Any suitable pressure sensitive adhesive known in the art may be employed with any suitable release paper or film known in the art.

The tapes are normally supplied as pre-cut strips mounted 5 to a release sheet, but may also be supplied as single rolls of pre-cut tape mounted on a release tape.

While the tapes are usually printed to simulate the appearance of a leather bound book spine and top page edge of a closed leather book, the tapes may also be printed to simulate the appearance of a fabric bound book spine and the top page edge of a closed fabric bound book. Other more intricate styles of bindings may be simulated beyond those shown in the Figures.

While the tapes are usually supplied with a pressure sensitive backing for affixing the tapes to a dust cover jacket, the tapes may be supplied without the pressure sensitive adhesive and release paper for special customers who desire to glue-apply their tapes to their dust cover jackets.

While the tapes are designed and usually employed to cover dust cover jackets of video and audio tape cassettes, since they can be trimmed with a scissors, they can be employed to cover the back spines of paper back books by trimming off the top page edge closed book portion of the tape in order to convert paper back books to more attractive books for library storage. Similarly, loose-leaf notebooks may have their spines covered by tapes trimmed of their top page edge portion in order to provide an attractive library-like look to said loose-leaf notebooks.

Modifications and variations are possible in light of the above description and teachings of this disclosure on these decorative tapes. The decorations possible for these tapes ecompass simulation of a wide variety of bookbinding art. The illustrations depicted or discussed should not be interpreted as in any way limiting the decorative features of the tapes of this disclosure. While a leather-like appearance has been emphasized because of its use in many beautiful bookbindings, other attractive bindings may be simulated by printing, and decorated tapes simulating such bindings should be considered within the scope of this disclosure.

While decorative tapes for dust cover jackets for video and audio cassettes and compact disks have been described, paper back books and other types of books also are occasionally supplied with dust cover jackets. The tapes of this disclosure also are applicable to such dust cover jackets to provide them an aesthetic appearance.

The dimensions of the printed tapes of this disclosure are chosen so that the said tapes cover the end wall back edge and the top edge of a dust cover jacket for a video tape cassette, an audio tape cassette, or a compact disk. For example, the parallelpiped-shaped dust cover jackets for video tape cassettes nominally measure 1 inch (2.54 cm.) wide by 7.5 inches (19.05 cm.) high by 4.125 inches (10.48 cm.) deep. The decoratively printed tapes for said video tape dust cover jackets measure 1 inch (2.54 cm.) wide by 11.625 inches (29.53 cm.), with the decorative printing simulating the spine of a book being 7.5 inches (19.05 cm.) in length, and the adjacent decorative printing simulating the appearance of the top page edge of a closed book being 4.125 inches (10.48 cm.) in length. Thus the dimensions of the decoratively printed tapes are chosen to cover the end wall back edge and the top edge of the dust cover jackets of the particular items being stored. Decoratively printed tapes for dust cover jackets for paper back books and for loose-leaf notebooks are sized similarly. Such tapes also may be trimmed to apply directly to the spines of paper back books and to loose-leaf notebooks. Size adjustments for specific dust cover jackets are made in the decorative tape dimensions and in the dimensions of the decorative printing on the tape.

I claim:

1. A process of decorating a dust cover jacket comprising:

providing a tape comprising paper, plastic film, or metal foil, or a flexible composite of these materials, wherein the tape has smooth, flat surfaces capable of being printed with multi-color impressions containing fine details, including shading;

providing a dust cover jacket having a parallelepiped shape;

printing one portion of one side of the tape with finely detailed multi-color printing with shading simulating the appearance of the spine of a high quality bound book;

printing an adjacent portion of said side of the tape with finely detailed printing with shading simulating the appearance of the top page edge of a closed high quality bound book;

adhering the reverse side of the tape opposite said one portion to a back face of said dust cover jacket; and adhering the reverse side of the tape opposite said adjacent portion to the top face of said dust cover jacket, whereby said back face and top face of said dust cover jacket are decorated to resemble the spine and top page edge of a high quality bound book, respectively.

2. The process of claim 1 wherein the adhering of said reverse sides of said tape is by means of a pressure sensitive adhesive on the side of said tape not bearing the printing.

3. The process of claim 1 wherein the adhering of said reverse sides of said tape is by means of a pressure sensitive adhesive bearing a removable release paper against said pressure sensitive adhesive which said release paper is discarded prior to adhering of said tape to said dust cover jacket.

4. The process of claim 1 wherein the adhering of said reverse sides of said tape is by means of a pressure sensitive adhesive, and wherein said tape is mounted with one or more other said tapes on a sheet of release paper with said pressure sensitive adhesive sides against said release paper, and wherein said tape is removed from said release paper before adhering said tape to said dust cover jacket.

5. The product made by the process of claim 1 comprising a dust cover jacket combined with a printed tape adhered to the back face and top face of said dust cover jacket to decorate said dust cover jacket to resemble the spine and top page edge of a high quality bound book, respectively.

* * * * *